US011959767B2

(12) United States Patent
Kashu et al.

(10) Patent No.: US 11,959,767 B2
(45) Date of Patent: Apr. 16, 2024

(54) MAP INFORMATION ASSESSMENT DEVICE, STORAGE MEDIUM STORING COMPUTER PROGRAM FOR MAP INFORMATION ASSESSMENT, AND MAP INFORMATION ASSESSMENT METHOD

(71) Applicants: TOYOTA JIDOSHA KABUSHIKI KAISHA, Toyota (JP); DENSO CORPORATION, Kariya (JP)

(72) Inventors: Takao Kashu, Tokyo-to (JP); Hiroaki Sakakibara, Tokyo-to (JP); Yasutaka Teramae, Kawasaki (JP); Hiroki Ukai, Kariya (JP); Masahiro Goto, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 43 days.

(21) Appl. No.: 17/706,135

(22) Filed: Mar. 28, 2022

(65) Prior Publication Data
US 2022/0316913 A1 Oct. 6, 2022

(30) Foreign Application Priority Data
Mar. 31, 2021 (JP) ................................. 2021-061359

(51) Int. Cl.
*G01C 21/00* (2006.01)
*G01C 21/36* (2006.01)

(52) U.S. Cl.
CPC ....... *G01C 21/3815* (2020.08); *G01C 21/367* (2013.01)

(58) Field of Classification Search
CPC ...... G01C 21/005; G01C 21/30; G01C 21/32; G01C 21/3815; G01C 21/367; G01C 21/26; B60W 60/001; B60W 2556/40
See application file for complete search history.

(56) References Cited

U.S. PATENT DOCUMENTS

2013/0158865 A1* 6/2013 Na ..................... G01C 21/005
701/446
2013/0311086 A1* 11/2013 Aoki .................. G01C 21/3844
701/446
(Continued)

FOREIGN PATENT DOCUMENTS

JP      2017-083446 A    5/2017
JP      2019-184498 A   10/2019
(Continued)

*Primary Examiner* — Anne Marie Antonucci
*Assistant Examiner* — Wesam N M N Almadhrhi
(74) *Attorney, Agent, or Firm* — Sughrue Mion, PLLC

(57) ABSTRACT

A map information assessment device has a processor configured to match a plurality of first zones representing a first road in a first map, with second zones representing a second road in a second map, the matching being made by using locations on the second road that are closest to the starting points of the first zones as the starting points, and using zones having the same lengths as the first zones, as the second zones corresponding to the first zones, to calculate zone adjacent distances between the end points of the second zones and the starting points of other second zones adjacent to those second zones, and to determine that positional information for the first road in a first zone is different from positional information for the second road in a second zone corresponding to that first zone, when the zone adjacent distance is greater than a threshold.

7 Claims, 12 Drawing Sheets

(56) References Cited

U.S. PATENT DOCUMENTS

| | | | |
|---|---|---|---|
| 2017/0122749 A1* | 5/2017 | Urano | G01S 19/42 |
| 2017/0122754 A1 | 5/2017 | Konishi et al. | |
| 2019/0162544 A1* | 5/2019 | Sekiguchi | G01C 21/3691 |
| 2019/0204096 A1* | 7/2019 | Cai | G01C 21/3446 |
| 2020/0400439 A1* | 12/2020 | Thompson | G01C 21/3697 |

FOREIGN PATENT DOCUMENTS

| | | |
|---|---|---|
| JP | 2019-184499 A | 10/2019 |
| JP | 2020-090196 A | 6/2020 |

* cited by examiner

FIG. 3

| ROAD LINK ID | STARTING POINT LOCATION | END POINT LOCATION | LINK INFORMATION | NAVIGATION ROUTE-FORMING INFORMATION |
|---|---|---|---|---|
| ⋮ | | | | |
| T1 | X11、Y11 | X12、Y12 | ⋯ | Y |
| T2 | X21、Y21 | X22、Y22 | ⋯ | Y |
| T3 | X31、Y31 | X32、Y32 | ⋯ | Y |
| ⋮ | | | | |

FIG. 4

| ROAD ZONE ID | CONNECTION SOURCE ID | CONNECTION TARGET ID | ROAD ZONE INFORMATION |
|---|---|---|---|
| ⋮ | | | |
| S1 | S0 | S2 | ⋯ |
| S2 | S1 | S3 | ⋯ |
| S3 | S2 | S4 | ⋯ |
| S4 | S3 | S5 | ⋯ |
| S5 | S4 | S6 | ⋯ |
| S6 | S5 | S7 | ⋯ |
| ⋮ | | | |

FIG. 7

| LINK ZONE ID (91) | STARTING POINT LOCATION (92) | END POINT LOCATION (93) | LINK ZONE INFORMATION (94) | NAVIGATION ROUTE-FORMING INFORMATION (95) | ROAD ZONE ID (96) | LOCATION ESTIMABILITY INFORMATION (97) |
|---|---|---|---|---|---|---|
| ... | | | | | | |
| C1 | S11, T11 | S12, T12 | ... | Y | S1 | Y |
| C2 | S21, T21 | X22, Y22 | ... | Y | S2 | Y |
| C3 | S31, T31 | S32, T32 | ... | Y | S3 | Y |
| C4 | S41, T41 | S42, T42 | ... | Y | S4 | Y |
| C5 | S51, T51 | S52, T52 | ... | Y | S5 | N |
| C6 | S61, T61 | S62, T62 | ... | Y | S6 | Y |
| ... | | | | | | |

90

MAP INFORMATION ASSESSMENT DEVICE, STORAGE MEDIUM STORING COMPUTER PROGRAM FOR MAP INFORMATION ASSESSMENT, AND MAP INFORMATION ASSESSMENT METHOD

FIELD

The present disclosure relates to a map information assessment device, to a storage medium storing a computer program for map information assessment, and to a map information assessment method.

BACKGROUND

An automatic control device mounted in a vehicle creates a navigation route for the vehicle based on the current location of the vehicle, the destination location of the vehicle, and a navigation map. The automatic control device estimates the current location of the vehicle using a location-estimating map, and controls the vehicle to travel along the navigation route.

A navigation route on a navigation map is represented by multiple road links connected via nodes. A navigation route for automatic control of a vehicle in a location-estimating map is represented as a connected series of multiple road zones representing roads on the location-estimating map. The vehicle automatic control device matches the road links representing the navigation route with road zones representing the roads on the location-estimating map, and uses the road zones associated with the navigation route to estimate the location of the vehicle for automatic control of vehicle driving.

Japanese Unexamined Patent Publication No. 2017-83446, for example, proposes a self-driving system having a navigation device that searches for a route (navigation route) from the current location of the vehicle to a destination location, and a high precision map unit that, based on the searched route and map information, divides the route into multiple block regions (road zones) and generates, in block region units, detailed information necessary for automatic control among detailed information corresponding to the multiple block regions.

SUMMARY

The map is updated with changes to actual road locations and the like. Therefore, differences in timing of map updating have caused positional information of roads on navigation maps to differ from positional information of the roads on the location-estimating map. When the positional information of a road on a navigation map differs from the positional information of the road on the location-estimating map, it may not be possible to carry out safe automatic control of the vehicle.

It is therefore an object of the present disclosure to provide a map information assessment device that can detect differences between positional information of roads on a first map (for example, a location-estimating map) and positional information of roads on a second map (for example, a navigation map).

According to one embodiment of the invention there is provided a map information assessment device. The map information assessment device has a matching unit that matches each of a plurality of first zones representing divisions of a first road in a first map used for estimating a location of a vehicle, with second zones representing divisions of a second road in a second map used for traveling of the vehicle, the matching being made by using a location on the second road that is closest to a starting point of one first zone as the starting point, and using a zone having the same length as the one first zone in the direction from the starting point toward an end point of the one first zone, as the second zone corresponding to the one first zone, a distance calculating unit that calculates a zone adjacent distance between the end point of one second zone and the starting point of another second zone adjacent to the one second zone and a zone assessment unit that determines that positional information for the first road in the first zone is different from positional information for the second road in the second zone corresponding to the first zone, when the zone adjacent distance is greater than a predetermined threshold.

In this map information assessment device, the distance calculating unit preferably calculates the zone adjacent distance between the end point of one second zone and the starting point of the other second zone adjacent to the one second zone, which is included in the second road representing the navigation route generated based on the current location of the vehicle, the destination location, and the second map.

The zone assessment unit in this map information assessment device also preferably determines that the entire positional information for the second road is different from the entire positional information for the first road of the first map, when the second road has at least a predetermined number of separated parts with zone adjacent distances that are larger than the predetermined threshold.

In addition, the matching unit of the map information assessment device preferably sets the first zone based on the inflection point of the first road.

In the map information assessment device, the second road may be associated with road information representing road-related information, and the map information assessment device preferably has an associating unit that associates road information associated with a second road separated part between the end point of one second zone and the other starting point of the second zone adjacent to the one second zone, with first zones respectively corresponding to the second zones located on either side of the separated part.

According to another embodiment, a non-transitory storage medium storing a computer program for map information assessment is provided. The computer program for map information assessment causes a processor to execute a process, and the process includes matching each of a plurality of first zones representing divisions of a first road in a first map used for estimating a location of a vehicle, with second zones representing divisions of a second road in a second map used for traveling of the vehicle, the matching being made by using a location on the second road that is closest to a starting point of one first zone as the starting point, and using a zone having the same length as the one first zone in the direction from the starting point toward an end point of the one first zone, as the second zone corresponding to the one first zone, calculating a zone adjacent distance between the end point of one second zone and the starting point of another second zone adjacent to the one second zone and determining that positional information for the first road in the first zone is different from positional information for the second road in the second zone corresponding to the first zone, when the zone adjacent distance is greater than a predetermined threshold.

According to yet another embodiment of the invention there is provided a map information assessment method. The map information assessment method is carried out by a map information assessment device, and the method includes matching each of a plurality of first zones representing divisions of a first road in a first map used for estimating a location of a vehicle, with second zones representing divisions of a second road in a second map used for traveling of the vehicle, the matching being made by using a location on the second road that is closest to a starting point of one first zone as the starting point, and using a zone having the same length as the one first zone in the direction from the starting point toward an end point of the one first zone, as the second zone corresponding to the one first zone, calculating a zone adjacent distance between the end point of one second zone and the starting point of another second zone adjacent to the one second zone and determining that positional information for the first road in the first zone is different from positional information for the second road in the second zone corresponding to the first zone, when the zone adjacent distance is greater than a predetermined threshold.

Since the map information assessment device of this disclosure can detect differences between positional information of roads in a first map and positional information of roads in a second map, it allows the vehicle to be safely controlled by automatic control using the first map and second map.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 3 is a diagram illustrating a road link management table.

FIG. 4 is a diagram illustrating a road zone management table.

FIG. 7 is a diagram illustrating a link zone management table.

DESCRIPTION OF EMBODIMENTS

Figure 1:
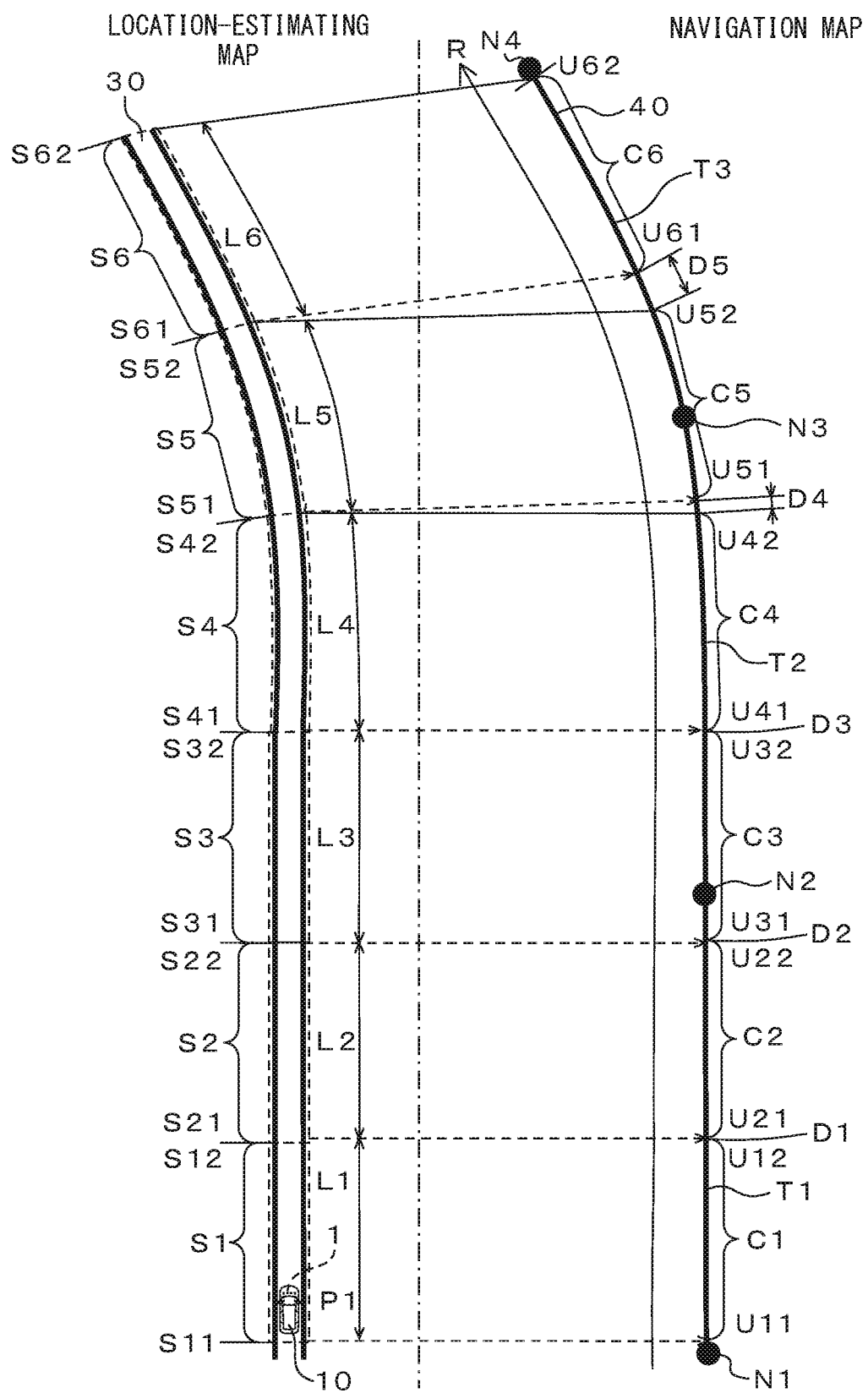
FIG. 1 is a diagram illustrating in overview the operation of a vehicle control system according to an embodiment.

FIG. 1 is a diagram showing a portion of a road 40 in a navigation map on a navigation route R, and a corresponding road 30 in a location-estimating map.

The road in the navigation map is divided into multiple road links, every two adjacent road links being represented as being connected via a node. Thus, the road 40 in the navigation map on the navigation route R of FIG. 1 also represents the multiple road links T1 to T3 as being connected by a plurality of nodes N1 to N4.

The road in the location-estimating map which the vehicle control system 1 uses to estimate the current location of the vehicle 10 is divided into multiple road zones, so that a single road is represented as a series of multiple road zones. Therefore, the road 30 of the location-estimating map in FIG. 1 is also represented as a series of road zones S1 to S6.

As explained below, the map information assessment device 12 of the vehicle control system 1 matches the road zones representing the road 30 of the location-estimating map (an example of first zones) with the link zones of the road 40 of the navigation map (an example of second zones).

Matching between the road zones S1 to S6 and link zones C1 to C6 by the vehicle control system 1 will now be explained with reference to FIG. 1. Matching between the road zone S1 and link zone C1 will be explained first. First, the starting point is set as the location U11 of the road 40 of the navigation map, which is closest to the starting point S11 of the road zone S1 of the road 30 in the location-estimating map. Next, in the road 40 of the navigation map, a zone from the starting point U11, having the length L1 from the starting point S11 to the end point S12 of the road zone S1 in the direction from the starting point S11 toward the end point S12 of the road zone S1, is matched as a link zone C1 corresponding to the road zone S1.

In FIG. 1, the road zones S2 to S6 are matched with link zones C2 to C6 in the same manner. As a result, a portion of the road 40 of the navigation map is divided into a plurality of link zones C1 to C6. This allows the portion of the road 40 representing the navigation route R to be represented as a series of the plurality of link zones C1 to C6 instead of the road links T1 to T3. In other words, while traveling in a predetermined link zone of the navigation route R, the vehicle control system 1 estimates the current location of the vehicle 10 using the location-estimating map with road zones corresponding to link zones.

However, in some cases it is not necessarily possible to directly use the location-estimating map with road zones corresponding to link zones. For example, the map may be updated with changes to actual road locations and the like. Therefore, differences in timing of map updating may cause positional information of roads on the navigation map to differ from positional information of the roads on the location-estimating map.

As explained below, the map information assessment device 12 of the vehicle control system 1 determines whether or not the road zones representing the road 30 of the location-estimating map (an example of first zones) differs from the link zones of the road 40 of the navigation map (an example of second zones), with which they are associated. Since the vehicle control system 1 can thus detect differences between positional information of roads in the location-estimating map and positional information of roads on the navigation map, it can safely carry out automatic control of the vehicle using the location-estimating map and the navigation map. In particular, since the vehicle control system 1 can detect whether or not differences between the location-estimating map and navigation map are differences that will not affect automatic control of the vehicle 10, it is possible to increase the number of situations in which automatic control of the vehicle is possible using the location-estimating map and navigation map.

Figure 2:
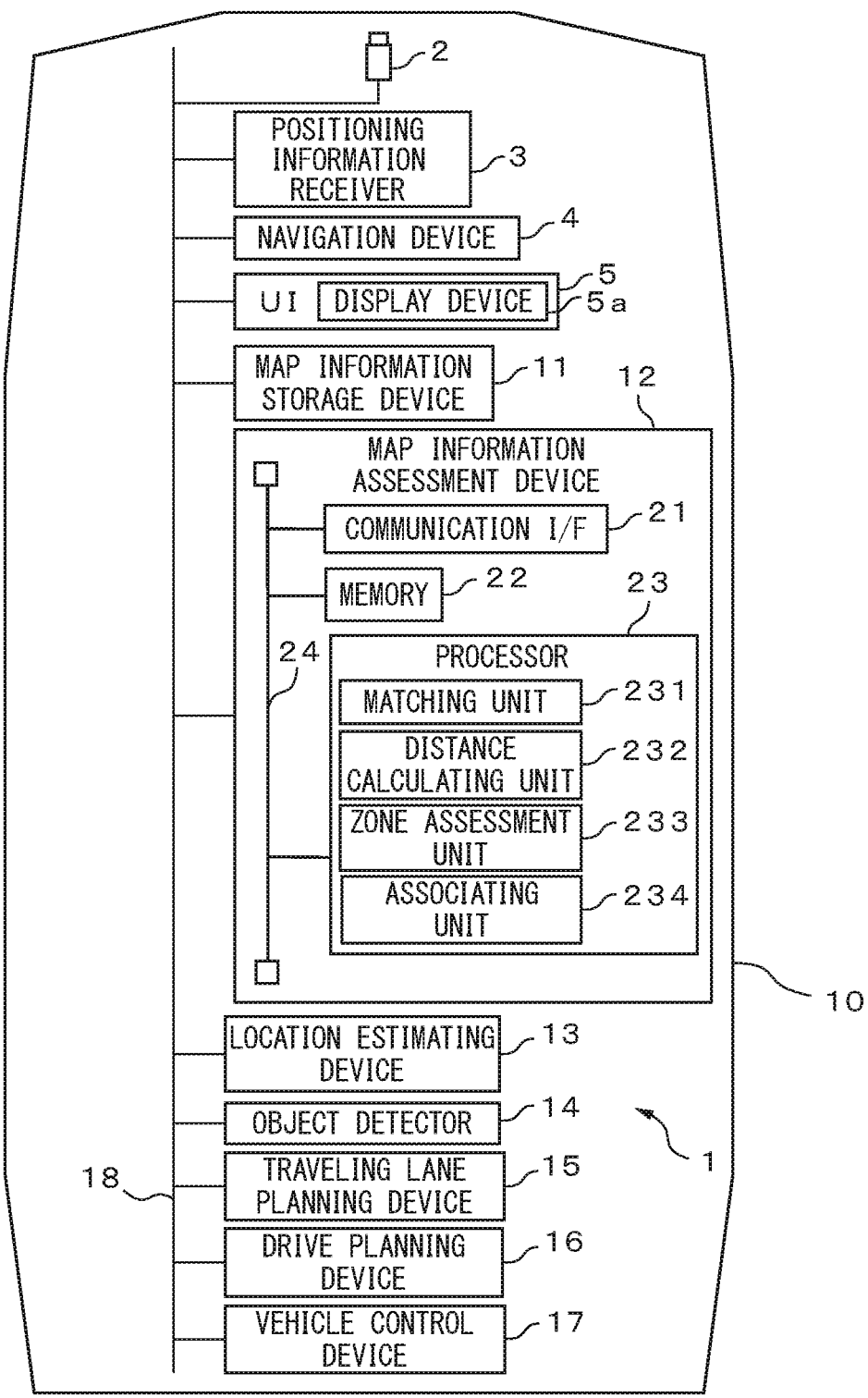
FIG. 2 is a general schematic drawing of a vehicle in which a vehicle control system of the embodiment is mounted.

FIG. 2 is a general schematic drawing of a vehicle 10 in which the vehicle control system 1 is mounted. The vehicle 10 has a camera 2, a positioning information receiver 3, a navigation device 4, a user interface (UI) 5, a map information storage device 11, a map information assessment device 12, a location estimating device 13, an object detector 14, a traveling lane planning device 15, a drive planning device 16 and a vehicle control device 17. The vehicle 10 may also have a LiDAR sensor, as a distance sensor (not shown) for measurement of the distance of the vehicle 10 to surrounding objects.

The camera 2, positioning information receiver 3, navigation device 4, UI 5, map information storage device 11, map information assessment device 12, location estimating device 13, object detector 14, traveling lane planning device 15, drive planning device 16 and vehicle control device 17 are connected in a communicable manner through an in-vehicle network 18 that conforms to controller area network standards.

The camera 2 is an example of an imaging unit provided in the vehicle 10. The camera 2 is mounted inside the vehicle 10 and directed toward the front of the vehicle 10. The camera 2, for example, takes a camera image in which the environment of a predetermined region ahead of the vehicle 10 is shown, at a predetermined cycle. The camera image can show the road in the predetermined region ahead of the vehicle 10, and road features such as surface lane marking lines on the road. The camera 2 has a 2D detector composed of an array of photoelectric conversion elements with visible light sensitivity, such as a CCD or C-MOS, and an imaging optical system that forms an image of the photographed region on the 2D detector.

Each time a camera image is taken, the camera 2 outputs the camera image and the camera image photograph time at which the camera image was taken, through the in-vehicle network 18 to the location estimating device 13 and object detector 14 etc. The camera image is also used for processing at the location estimating device 13 to estimate the location of the vehicle 10. At the object detector 14, the camera image is used for processing to detect other objects surrounding the vehicle 10.

The positioning information receiver 3 outputs positioning information that represents the current location of the vehicle 10. The positioning information receiver 3 may be a GNSS receiver, for example. The positioning information receiver 3 outputs positioning information and the positioning information acquisition time at which the positioning information has been acquired, to the navigation device 4 and map information storage device 11 etc., each time positioning information is acquired at a predetermined receiving cycle.

Based on the navigation map information, the destination location of the vehicle 10 input through the UI 5, and positioning information representing the current location of the vehicle 10 input from the positioning information receiver 3, the navigation device 4 creates a navigation route R from the current location to the destination location of the vehicle 10. The navigation route R includes information relating to the locations of right turns, left turns, merging and branching. In the navigation map, roads are represented as multiple road links connected by nodes. Each of the nodes and road links is identified using identification information. The locations of the road links and nodes are represented on a world coordinate system where the origin is a predetermined location, for example. The navigation device 4 stores a road link management table 70 in which information for all of the road links in the navigation map is registered. The road link management table 70 will be explained below. When the destination location has been newly set or the current location of the vehicle 10 has exited the navigation route R, the navigation device 4 creates a new navigation route R for the vehicle 10. Every time a navigation route R is created, the navigation device 4 outputs the navigation route R to the map information assessment device 12 and location estimating device 13 etc., via the in-vehicle network 18.

The UI 5 is an example of the notifying unit. The UI 5, controlled by the navigation device 4 and vehicle control device 17, notifies the driver of the vehicle 10 traveling information. The UI 5 also creates an operation signal in response to operation of the vehicle 10 by the driver. The traveling information of the vehicle 10 includes information relating to the current location of the vehicle and the current and future route of the vehicle, such as the navigation route. The UI 5 has a display device 5a such as a liquid crystal display or touch panel, for display of the traveling information. The UI 5 may also have an acoustic output device (not shown) to notify the driver of traveling information. The UI 5 also has a touch panel or operating button, for example, as an input device for inputting operation information from the driver to the vehicle 10. The operation information may be, for example, a destination location, transit points, vehicle speed or other control information of the vehicles 10. The UI 5 outputs the input operation information to the navigation device 4 and the vehicle control device 17 etc., via the in-vehicle network 18.

The map information storage device 11 stores a wide-area location-estimating map for a relatively wide area (an area of 10 to 30 $km^2$, for example) that includes the current location of the vehicle 10. The location-estimating map preferably has high precision map information including three-dimensional information for the road surface, information for the types and locations of structures and road features such as road lane marking lines, and the legal speed limit for the road. The roads are represented as a series of multiple road zones. In a terrain where multiple roads are connected, such as road branching locations, merging locations and intersections, preferably the road zones are represented with the branching locations, merging locations or intersections included in a single road zone. Each of the road zones is identified using identification information. The locations of the road zones are represented on a world coordinate system where the origin is a predetermined location, for example. The map information storage device 11 stores a road zone management table 80 where information for road zones in the location-estimating map is registered. The road zone management table 80 will now be explained. One or more traffic lanes in a road are associated with each one of the road zones. The locations of traffic lanes and road zones in the location-estimating map are represented on a world coordinate system where the origin is a predetermined location, for example.

Each time positioning information is input from the positioning information receiver 3, the map information storage device 11 refers to the stored wide-area location-estimating map and outputs a location-estimating map for a relatively narrow area including the current location represented by the positioning information (for example, an area of 100 $m^2$ to 10 $km^2$), through the in-vehicle network 18 to the location estimating device 13, object detector 14, traveling lane planning device 15, drive planning device 16 and vehicle control device 17 etc.

The map information assessment device 12 carries out match processing whereby it matches link zones representing divisions of roads in the navigation map used for traveling of the vehicle 10, with each of the multiple road zones representing divisions of the road in the location-estimating map used for estimating the location of the vehicle 10. The map information assessment device 12 also carries out zone distance calculation processing in which it calculates the zone adjacent distance between the end point of a predetermined link zone, and the starting point of another link zone adjacent to that link zone. The map information assessment device 12 also carries out assessment processing in which it determines that the positional information for a road in a road zone differs from the positional information for a road in a link zone corresponding to the road zone, when the zone adjacent distance is greater than a predetermined distance threshold. For this purpose, the map information assessment device 12 has a communication interface (IF) 21, a memory 22 and a processor 23. The communication interface 21, memory 22 and processor 23 are connected via signal wires 24. The communication interface 21 has an interface circuit to connect the map information assessment device 12 with the in-vehicle network 18.

All or some of the functions of the map information assessment device 12 are functional modules driven by a computer program operating on the processor 23, for example. The processor 23 has a matching unit 231, a distance calculating unit 232, a zone assessment unit 233 and an associating unit 234. Alternatively, the functional module of the processor 23 may be a specialized computing circuit in the processor 23. The processor 23 comprises one or more CPUs (Central Processing Units) and their peripheral circuits. The processor 23 may also have other computing circuits such as a logical operation unit, numerical calculation unit or graphic processing unit. The memory 22 is an example of a memory unit, and it has a volatile semiconductor memory and a non-volatile semiconductor memory, for example. The memory 22 stores an application computer program and various data to be used for information processing carried out by the processor 23 of each device. Operation of the map information assessment device 12 will be described in detail below.

The location estimating device 13 estimates the location of the vehicle 10 at the camera image photograph time, based on the road features surrounding the vehicle 10 represented in the camera image. For example, the location estimating device 13 compares lane marking lines identified in the camera image with lane marking lines represented in the location-estimating map input from the map information storage device 11, and determines the estimated location and estimated declination of the vehicle 10 at the camera image photograph time. The location estimating device 13 estimates the road traveling lane where the vehicle 10 is located, based on the lane marking lines represented in the map information and on the estimated location and estimated declination of the vehicle 10. Each time the estimated location, estimated declination and traveling lane of the vehicle 10 are determined at the camera image photograph time, the location estimating device 13 outputs this information to the object detector 14, traveling lane planning device 15, drive planning device 16 and vehicle control device 17 etc.

The object detector 14 detects other objects around the vehicle 10 and their types (for example, vehicles) based on the camera image. Other objects also include other vehicles traveling around the vehicle 10. The object detector 14 tracks other detected objects and determines the trajectories of the other objects. In addition, the object detector 14 identifies the traveling lanes in which the other objects are traveling, based on the lane marking lines represented in the map information and the locations of the objects. The object detector 14 outputs object detection information which includes information representing the types of other objects that were detected, information indicating their locations, and also information indicating their traveling lanes, to the traveling lane planning device 15 and drive planning device 16 etc.

At a traveling lane-planning creation time set in a predetermined cycle, the traveling lane planning device 15 selects a traffic lane on the road on which the vehicle 10 is traveling, within the nearest driving zone (for example, 10 km) selected from the navigation route, based on the map information, the navigation route and surrounding environment information and the current location of the vehicle 10, and creates a traveling lane plan representing the scheduled traveling lane for traveling of the vehicle 10. For example, the traveling lane planning device 15 creates a traveling lane plan for the vehicle 10 to travel on a traffic lane other than a passing traffic lane. Each time a traveling lane plan is created, the traveling lane planning device 15 outputs the traveling lane plan to the drive planning device 16.

The traveling lane planning device 15 also determines whether or not a lane change is necessary within the nearest driving zone selected from the navigation route R, based on the map information, the navigation route R and the current location of the vehicle 10. The traveling lane planning device 15 may further utilize surrounding environment information or vehicle status information to determine whether or not a lane change is necessary. The surrounding environment information includes the locations and speeds of other vehicles traveling around the vehicle 10. The vehicle status information includes the current location of the vehicle 10, and the vehicle speed, acceleration and traveling direction. Specifically, the traveling lane planning device 15 determines whether or not a lane change is necessary for moving to a traffic lane toward the destination location of the vehicle 10, based on the navigation route R and the current location of the vehicle 10. It is determined whether or not the vehicle 10 is approaching another road that merges ahead from the traveling road on which it is currently traveling (merge), or the vehicle 10 is exiting onto another road branching out ahead from the traveling road (branch). Since merging and branching involve movement of the vehicle from a lane of the traveling road to a lane in another road, a lane change is carried out.

At a driving plan creation time set with a predetermined cycle, the drive planning device 16 carries out driving plan processing in which it creates a driving plan representing the scheduled traveling trajectory of the vehicle 10 up until a predetermined time (for example, 5 seconds), based on the traveling lane plan, the map information, the current location of the vehicle 10, the surrounding environment information and the vehicle status information. The driving plan is represented as a combination of the target location of the vehicle 10 and the target vehicle speed at the target location, at each time from the current time until the predetermined time. The cycle in which the driving plan is created is preferably shorter than the cycle in which the traveling lane plan is created. When the traveling lane plan includes a lane change wherein the vehicle 10 is to move between traffic lanes, the drive planning device 16 creates a driving plan that includes the lane change, in such a manner that a spacing of at least a predetermined distance can be maintained between the vehicle 10 and other vehicles. When the traveling lane plan includes a lane change wherein the vehicle 10 is to move between lanes, but a spacing of at least a predetermined distance cannot be ensured between the vehicle 10 and another vehicle, the drive planning device 16 generates a driving plan for stopping the vehicle 10. The drive planning device 16 outputs the driving plan to the vehicle control device 17 for each driving plan generated.

The vehicle control device 17 controls each unit of the vehicle 10 based on the current location of the vehicle 10 and the vehicle speed and yaw rate, as well as on the driving plan generated by the drive planning device 16, so that the vehicle 10 travels along the navigation route R. For example, the vehicle control device 17 determines the steering angle, acceleration and angular acceleration of the vehicle 10 according to the driving plan and the speed and yaw rate of the vehicle 10, and sets the amount of steering, and the accelerator or brake level so as to match that steering angle, accelerator level and angular acceleration. The vehicle control device 17 also outputs a control signal corresponding to a set steering amount, to an actuator (not shown) that controls the steering wheel for the vehicle 10, via the in-vehicle network 18. The vehicle control device 17 also determines the amount of fuel injection according to a set accelerator level, and outputs a control signal corresponding to the amount of fuel injection to a drive unit (not shown) of the engine of the vehicle 10, via the in-vehicle network 18. Alternatively, the vehicle control device 17 may output a control signal corresponding to a set brake level to the brake (not shown) of the vehicle 10, via the in-vehicle network 18.

The road link management table will now be explained with reference to FIG. 3. FIG. 3 is a diagram illustrating an example of a road link management table. All of the road links in the navigation map are registered in the road link management table 70. The road link management table 70 has a road link ID column 71, a starting point location column 72, an end point location column 73, a link information column 74 and a navigation route-forming information column 75. Identification information for road links is registered in the road link ID column 71. Positional information for nodes as the starting points of road links is registered in the starting point location column 72. Positional information for nodes as the end points of road links is registered in the end point location column 73. In the link information column 74, information is registered such as identification information for roads represented by road links, and positional information and road information for each of the coordinates representing the routes of the road links. The road information may be traffic information (such as VICS$^R$ information) or information regarding availability of use of the automatic control system. Traffic information includes, for example, information relating to road obstacles, weather, traffic lane restrictions, chain restrictions, road closures, one-way restrictions and lamp restrictions. The navigation route-forming information column 75 registers information indicating whether or not a road link is included in a road forming the navigation route R (for example, "Y" if the road link is one forming the navigation route or "N" if the road link is not one forming the navigation route). The road information is registered in the link information column 74 together with locations or zones among the road links with which the road information is associated. The navigation device 4 receives road information from an external server via a base station, by wireless communication via a wireless communication device (not shown) mounted in the vehicle 10, and updates the link information column 74 of the road link management table 70 at a predetermined cycle, in association with the road links corresponding to the locations in the road information. The navigation device 4 updates the navigation route-forming information column 75 of the road link management table 70 each time a navigation route R is generated. Similarly, the navigation device 4 may store a node management table in which information for nodes in the navigation map is registered.

The road zone management table will now be explained with reference to FIG. 4. FIG. 4 is a diagram illustrating an example of a road zone management table. Multiple road zones in the location-estimating map are registered in the road zone management table 80. The road zone management table 80 has a road zone ID column 81, a connection source ID column 82, a connection target ID column 82 and a road zone information column 84. Identification information for the road zones is registered in the road zone ID column 81. Road zone identification information for the road zone connection sources is registered in the connection source ID column 82. Road zone identification information for the road zone connection targets is registered in the connection target ID column 82. Information is registered in the road zone information column 84, such as identification information for roads represented by the road zones, road zone locations (positional information representing coordinates for road zones from starting points to end points), traffic lane information and road information. In addition, information representing the types and locations of road features such as road lane marking lines, and structures, as well as information for the legal speed limits of roads, are also registered in the road zone information column 84. As explained in detail below, road information for road links corresponding to the road zones is also registered in the road zone information column 84.

For FIG. 2, the map information storage device 11, map information assessment device 12, location estimating device 13, object detector 14, traveling lane planning device 15, drive planning device 16 and vehicle control device 17 were explained as separate devices, but all or some of them may be constructed in a single device.

Figure 5:
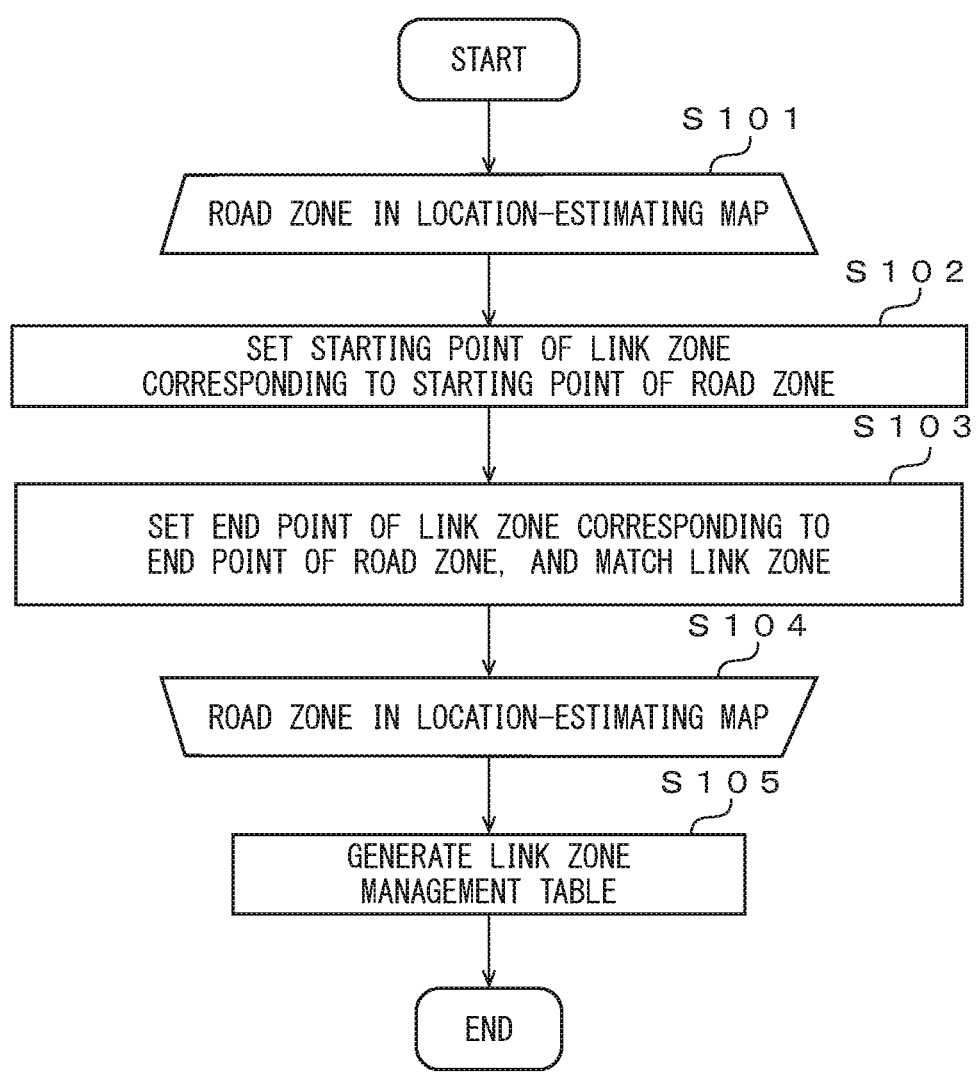
FIG. 5 is an operation flow chart for map information assessment processing by a vehicle control system of the embodiment (1).

FIG. 5 is an example of an operation flow chart for map information assessment processing by the map information assessment device 12 of the vehicle control system 1. The map information assessment device 12 carries out match processing as part of the map information assessment processing, according to operation flow chart shown in FIG. 5, each time the location-estimating map or navigation map is updated. Match processing by the map information assessment device 12 will now be explained with reference to FIG. 5.

First, the matching unit 231 of the map information assessment device 12 of the vehicle control system 1 reads out the location-estimating map and road zone management table 80 stored by the map information storage device 11, and carries out processing between step S101 and step S104, for each road zone in the location-estimating map. For example, the matching unit 231 carries out processing between step S101 and step S104 according to the order of road zone IDs registered in the road zone management table 80.

Figure 6:
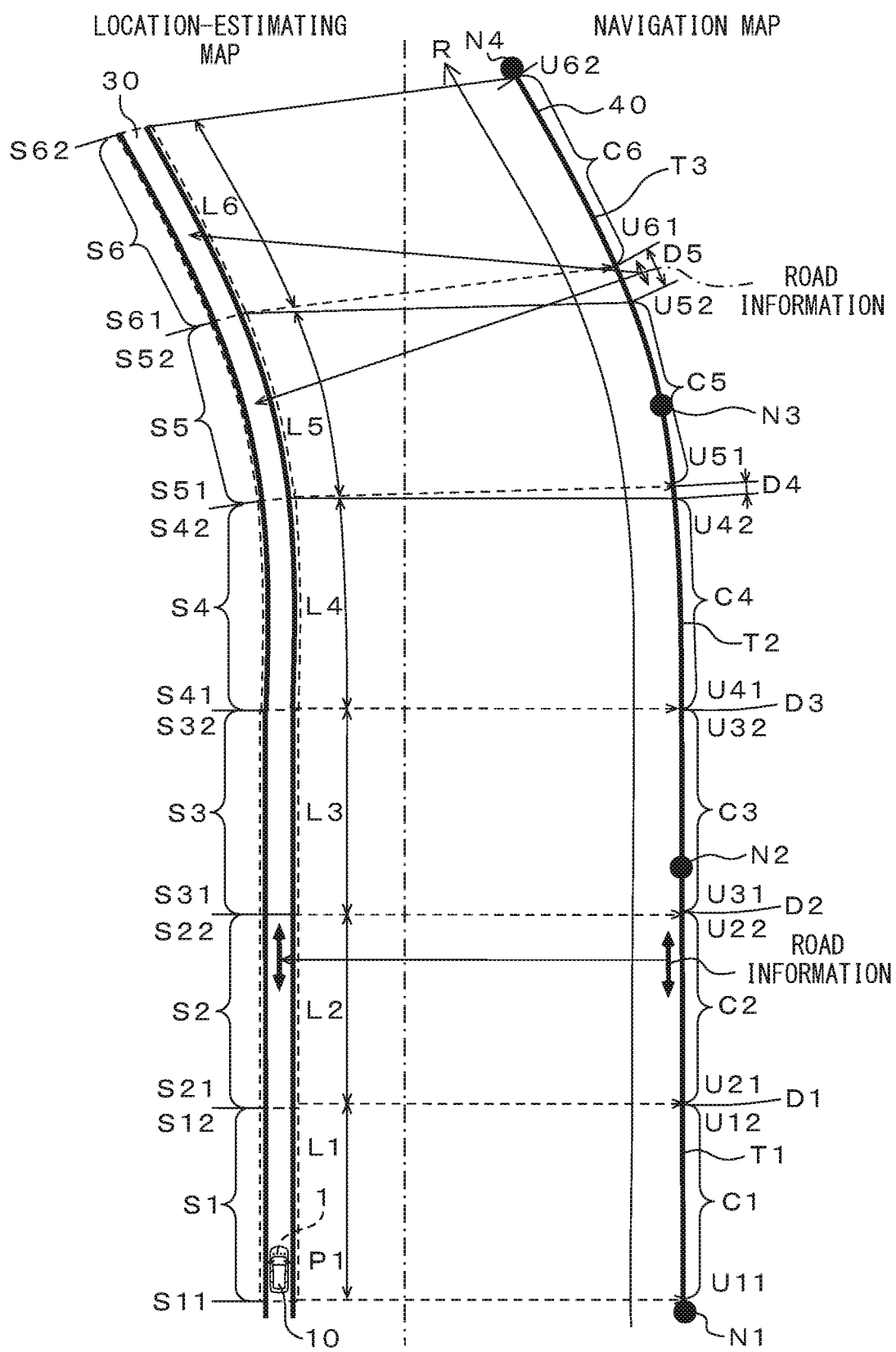
FIG. 6 is a diagram illustrating map information assessment processing by a vehicle control system (1).

First, the matching unit 231 sets the starting point of the link zone to be the location on the road of the navigation map closest to the starting point of the road zone of the location-estimating map (step S102). Processing by the matching unit 231 will now be explained with reference to FIG. 6. In the example shown in FIG. 6, the road 30 has a straight section and a curved section, with the road 40 of the navigation map representing part of the navigation route R. FIG. 6 corresponds to FIG. 1.

In the example shown in FIG. 6, the matching unit 231 sets the starting point U11 of the link zone to be the location on the road 40 of the navigation map that is closest to the starting point S11 of the road zone S1 of the road 30. The matching unit 231 may also select the center location in the widthwise direction at the end of the connection source side of the road zone S1, as the starting point S11 of the road zone S1 of the road 30. In the navigation map, the road links are represented as a series of coordinates (in a world coordinate system, for example) representing roads. The matching unit 231 identifies a location on the road link that is closest the starting point S11 of the road zone S1, as the location U11 on the road 40 represented by the road link.

Similarly, the matching unit 231 sets the starting point U21 of the link zone to be the location on the road 40 of the navigation map that is closest to the starting point S21 of the road zone S2 of the road 30. The matching unit 231 also sets the starting point U31 of the link zone to be the location on the road 40 of the navigation map that is closest to the starting point S31 of the road zone S3 of the road 30.

The matching unit 231 still further sets the starting point U41 of the link zone to be the location on the road 40 of the navigation map that is closest to the starting point S41 of the road zone S4 of the road 30. The matching unit 231 also sets the starting point U51 of the link zone to be the location on the road 40 of the navigation map that is closest to the starting point S51 of the road zone S5 of the road 30. The matching unit 231 still further sets the starting point U61 of the link zone to be the location on the road 40 of the navigation map that is closest to the starting point S61 of the road zone S6 of the road 30.

The matching unit 231 matches zones having the same lengths as the road zones, in the direction from the starting points toward the end points of the road zones, to be link zones corresponding to the road zones (step S103).

In the example shown in FIG. 6, the matching unit 231 sets the end point U12 of the link zone to be a point having the same length L1 as the road zone S1 along the road link T1, in the direction from the starting point S11 toward the end point S12 of the road zone S1. The matching unit 231 may also select the center location in the widthwise direction at the end of the connection target side of the road zone S1, as the end point S12 of the road zone S1 of the road 30. The zone between the starting point U11 and the end point U12 is matched as the link zone C1 corresponding to the road zone S1. The link zone C1 is the zone between the starting point U11 and the end point U12, on the road link. The matching unit 231 also matches a zone having the same length L2 as the road zone S2, in the direction from the starting point S21 toward the end point S22 of the road zone S2, along the road link T1, to be the link zone C2 corresponding to the road zone S2. The link zone C2 is the zone between the starting point U21 and the end point U22, on the road link. The matching unit 231 also matches a zone having the same length L3 as the road zone S3, in the direction from the starting point S31 toward the end point S32 of the road zone S3, along the road links T1, T2, to be the link zone C3 corresponding to the road zone S3. The link zone C3 is the zone between the starting point U31 and the end point U32, on the road link.

The matching unit 231 also matches a zone having the same length L4 as the road zone S4, in the direction from the starting point S41 toward the end point S42 of the road zone S4, along the road link T2, to be the link zone C4 corresponding to the road zone S4. The link zone C4 is the zone between the starting point U41 and the end point U42, on the road link. The matching unit 231 also matches a zone having the same length L5 as the road zone S5, in the direction from the starting point S51 toward the end point S52 of the road zone S5, along the road links T2, T3, to be the link zone C5 corresponding to the road zone S5. The link zone C5 is the zone between the starting point U51 and the end point U52, on the road link. The matching unit 231 also matches a zone having the same length L6 as the road zone S6, in the direction from the starting point S61 toward the end point S62 of the road zone S6, along the road link T3, to be the link zone C6 corresponding to the road zone S6. The link zone C6 is the zone between the starting point U61 and the end point U62, on the road link.

The matching unit 231 then carries out processing of step S102 and step S103 for each of the other road zones in the location-estimating map, and generates a link zone management table in which the information representing the link zones is registered (step S105). The link zone management table is stored in the memory 22.

FIG. 7 is a diagram illustrating an example of a link zone management table. The link zone management table 90 has a link zone ID column 91, a starting point location column 92, an end point location column 93, a link zone information column 94, a navigation route-forming information column 95, a road zone ID column 96 and a location estimability information column 97. Identification information for link zones is registered in the link zone ID column 91. Positional information for starting points of link zones is registered in the starting point location column 92. Positional information for end points of link zones is registered in the end point location column 93. Positional information for the starting points and end points of link zones is represented on a world coordinate system, for example. Information is registered in the link zone information column 94, such as identification information for roads represented by link zones, together with positional information for each of the coordinates representing the routes of the link zones. The registered identification information for roads represented by link zones is link information for road links where link zones overlap with zones, and specifically information for the portions of roads that overlap with the link zones. The navigation route-forming information column 95 registers information indicating whether or not a link zone is included in a road forming the navigation route R (for example, "Y" if the link zone forms a navigation route or "N" if the link zone does not form a navigation route). Registered information indicating whether or not a link zone is included in a road forming a navigation route R is information indicating whether or not a road link where a link zone overlaps with a zone is included in the road forming the navigation route R. The road zone ID column 96 registers road zone IDs for road zones matched with link zones. In the location estimability information column 97, information is registered which indicates whether or not the current location of the vehicle 10 is estimable using the location-estimating map, with road zones associated with the link zones (for example, "Y" if it is estimable, or "N" if it is not estimable).

Figure 8:
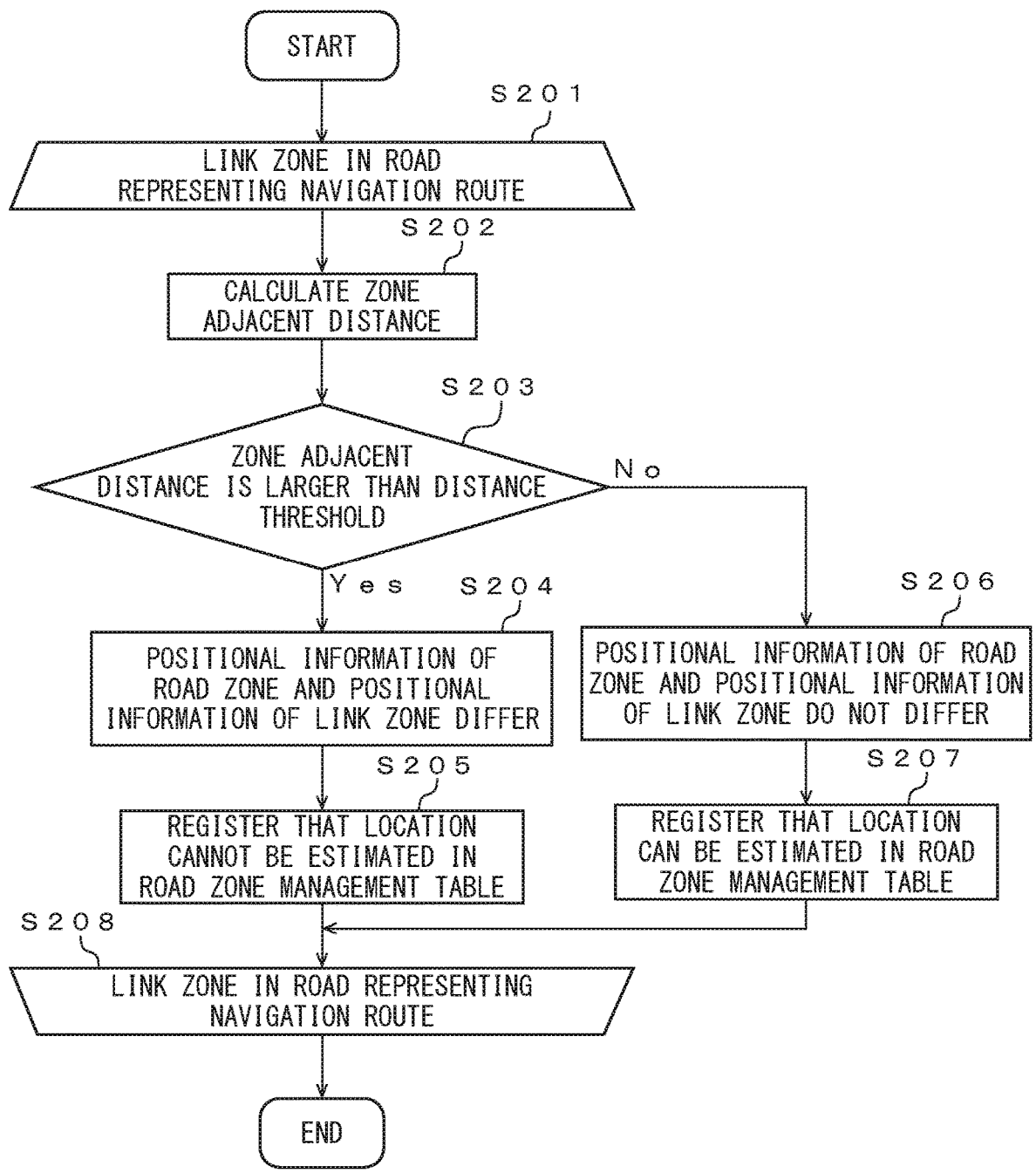
FIG. 8 is an operation flow chart for map information assessment processing by a vehicle control system of the embodiment (2).

After the match processing has been completed, the map information assessment device 12 carries out the zone distance calculation processing and assessment processing shown in FIG. 8, of the map information assessment processing. The zone distance calculation processing and assessment processing shown in FIG. 8 are carried out each time a navigation route R is newly generated. Although the map information assessment device 12 carries out match processing each time the location-estimating map or navigation map is updated, it may also carry out match processing before the zone distance calculation processing and assessment processing shown in FIG. 8.

The map information assessment device 12 carries out processing between step S201 and step S208 for each of the link zones in the roads representing the navigation route R. For example, the map information assessment device 12 refers to the link zone management table 90, selecting link zones according to the order of link zone IDs, whose information indicating that the link zones are in roads forming the navigation route R is registered in the navigation route-forming information column 95, and carries out processing between step S201 and step S208.

First, for a link zone selected from the link zone management table 90, the distance calculating unit 232 of the map information assessment device 12 calculates a zone adjacent distance between the end point of the link zone and the starting point of another link zone that is adjacent to that link zone (step S202).

In the example shown in FIG. 6, for the link zone C1 in the road 40 representing the navigation route R, the distance calculating unit 232 calculates a zone adjacent distance D1 between the end point U12 of the link zone C1 and the starting point U21 of the link zone C2 that is adjacent to the link zone C1. The zone adjacent distance D1 represents the distance on the road link of the separated part between the link zone C1 and the link zone C2. The zone adjacent distance may be zero in some cases. For the link zone C2 in the road 40 representing the navigation route R, the distance calculating unit 232 calculates a zone adjacent distance D2 on the road link between the end point U22 of the link zone C2 and the starting point U31 of another link zone C3 that is adjacent to the link zone C2.

For the link zone C3 in the road 40 representing the navigation route R, the distance calculating unit 232 calculates a zone adjacent distance D3 between the end point U32 of the link zone C3 and the starting point U41 of another link zone C4 that is adjacent to the link zone C3. The zone adjacent distance D3 represents the distance on the road link of the separated part between the link zone C3 and the link zone C4. For the link zone C4 in the road 40 representing the navigation route R, the distance calculating unit 232 calculates a zone adjacent distance D4 on the road link between the end point U42 of the link zone C4 and the starting point U51 of another link zone C5 that is adjacent to the link zone C4. For the link zone C5 in the road 40 representing the navigation route R, the distance calculating unit 232 calculates a zone adjacent distance D5 on the road link between the end point U52 of the link zone C5 and the starting point U61 of another link zone C6 that is adjacent to the link zone C5.

Next, the zone assessment unit 233 of the map information assessment device 12 determines whether or not the zone adjacent distance is greater than a predetermined distance threshold (step S203).

If the zone adjacent distance is greater than the predetermined distance threshold (step S203—Yes), the zone assessment unit 233 determines that the positional information of the road within the assessed road zone of the location-estimating map differs from the positional information of the road on the navigation map within the link zone corresponding to that road zone (step S204). When the positional information of a road zone differs from the positional information of the corresponding link zone, it is not possible to estimate the current location of the vehicle 10 for that road zone, using the location-estimating map. Incidentally, this assessment does not determine that the positional information for all of the roads including the road zone assessed in the location-estimating map, differs from the positional information for all of the roads of the navigation map within the link zone corresponding to that road zone.

If the zone adjacent distance is not greater than the predetermined distance threshold (step S203—No), then the zone assessment unit 233 determines that the positional information of the road of the location-estimating map within the assessed road zone does not differ from the positional information of the road on the navigation map within the link zone corresponding to that road zone (step S206). When the positional information of a road zone does not differ from the positional information of the corresponding link zone, it is possible to estimate the current location of the vehicle 10 for that road zone, using the location-estimating map.

In the example shown in FIG. 6, the zone assessment unit 233 determines that the zone adjacent distance D1 is not greater than the predetermined distance threshold in the link zone C1, and therefore it refers to the link zone management table 90, and registers information indicating that the current location of the vehicle 10 can be estimated using the location-estimating map, in the location estimability information column 97 associated with the link zone C1 (step S207). In the road zone S1 that is associated with the link zone C1, of which the information is registered in the location estimability information column 97 indicating that the current location of the vehicle 10 can be estimated using the location-estimating map, the current location of the vehicle 10 can be estimated using the location-estimating map. Since the zone assessment unit 233 also determines that the zone adjacent distance D2 is not greater than the predetermined distance threshold for the link zone C2 as well, it refers to the link zone management table 90, and registers information indicating that the current location of the vehicle 10 can be estimated using the location-estimating map, in the location estimability information column 97 associated with the link zone C2 (step S207).

Since the zone assessment unit 233 further determines that the zone adjacent distance D3 is not greater than the predetermined distance threshold for the link zone C3 as well, it refers to the link zone management table 90, and registers information indicating that the current location of the vehicle 10 can be estimated using the location-estimating map, in the location estimability information column 97 associated with the link zone C3 (step S207). Since the zone assessment unit 233 further determines that the zone adjacent distance D4 is not greater than the predetermined distance threshold for the link zone C4 as well, it refers to the link zone management table 90, and registers information indicating that the current location of the vehicle 10 can be estimated using the location-estimating map, in the location estimability information column 97 associated with the link zone C4 (step S207). For the link zone C5, on the other hand, the zone assessment unit 233 determines that the zone adjacent distance D5 is greater than the predetermined distance threshold, and therefore it refers to the link zone management table 90, and registers information indicating that the current location of the vehicle 10 cannot be estimated using the location-estimating map, in the location estimability information column 97 associated with the link zone C5 (step S205).

When the road zone is a straight section of the road 30, the vehicle control system 1 may be able to safely drive the vehicle 10 by automatic control by identifying road features such as lane marking lines, even if there are differences between the positional information of the roads of the location-estimating map and the positional information of roads on the navigation map.

When the road zone is a curved section of the road 30, on the other hand, the vehicle control system 1 may not be able to safely drive the vehicle 10 by automatic control even by identifying road features such as lane marking lines, if there are differences between the positional information of the roads of the location-estimating map and the positional information of roads on the navigation map.

In the map information assessment device 12, therefore, the predetermined distance threshold is preferably set so that it can be determined that it is possible for driving of the vehicle 10 to be safely carried out by automatic control when the road 30 is straight linear, but that it may not be possible for driving of the vehicle 10 to be safely carried out by automatic control when the road 30 is curved, for example. The distance threshold is preferably a value equal to or greater than the width of the road. The positional information for road links in the navigation map may vary by about the width of the road, at maximum, in the widthwise direction of the road. The distance threshold is preferably set as appropriate for the width of the road. The distance threshold may also be a value that is at least the maximum possible road width. For example, 100 m may be used as the distance threshold.

As explained above, the map information assessment device 12 carries out processing between step S201 and step S208 for each of the link zones in the roads representing the navigation route R. As a result, it is determined whether or not the current location of the vehicle 10 can be estimated using the location-estimating map, for each of the road zones matched with link zones in the roads representing the navigation route R. As explained above, in the road zone that is associated with the link zone, of which the information is registered in the location estimability information column 97 indicating that the current location of the vehicle 10 can be estimated using the location-estimating map, the current location of the vehicle 10 can be estimated using the location-estimating map.

When the vehicle 10 is to be driven by automatic control, the drive planning device 16 of the vehicle control system 1 refers to the navigation route R and link zone management table 90, and acquires information representing a road zone corresponding to a link zone that is scheduled to be entered. The drive planning device 16 determines beforehand whether or not the current location of the vehicle 10 can be estimated using the location-estimating map, for road zones that are scheduled to be entered from the current moment. Using the display device 5a of the UI 5, for example, the drive planning device 16 notifies the driver that driving of the vehicle 10 is to be changed from automatic control to manual control, or is to be hands-on, when it has been determined that the current location of the vehicle 10 cannot be estimated using the location-estimating map, for a road zone that is scheduled to be entered from the current moment. This allows the driver to at least operate steering, so that the vehicle 10 can travel in a road zone where it has been assessed that the current location of the vehicle 10 cannot be estimated using the location-estimating map.

Figure 9:
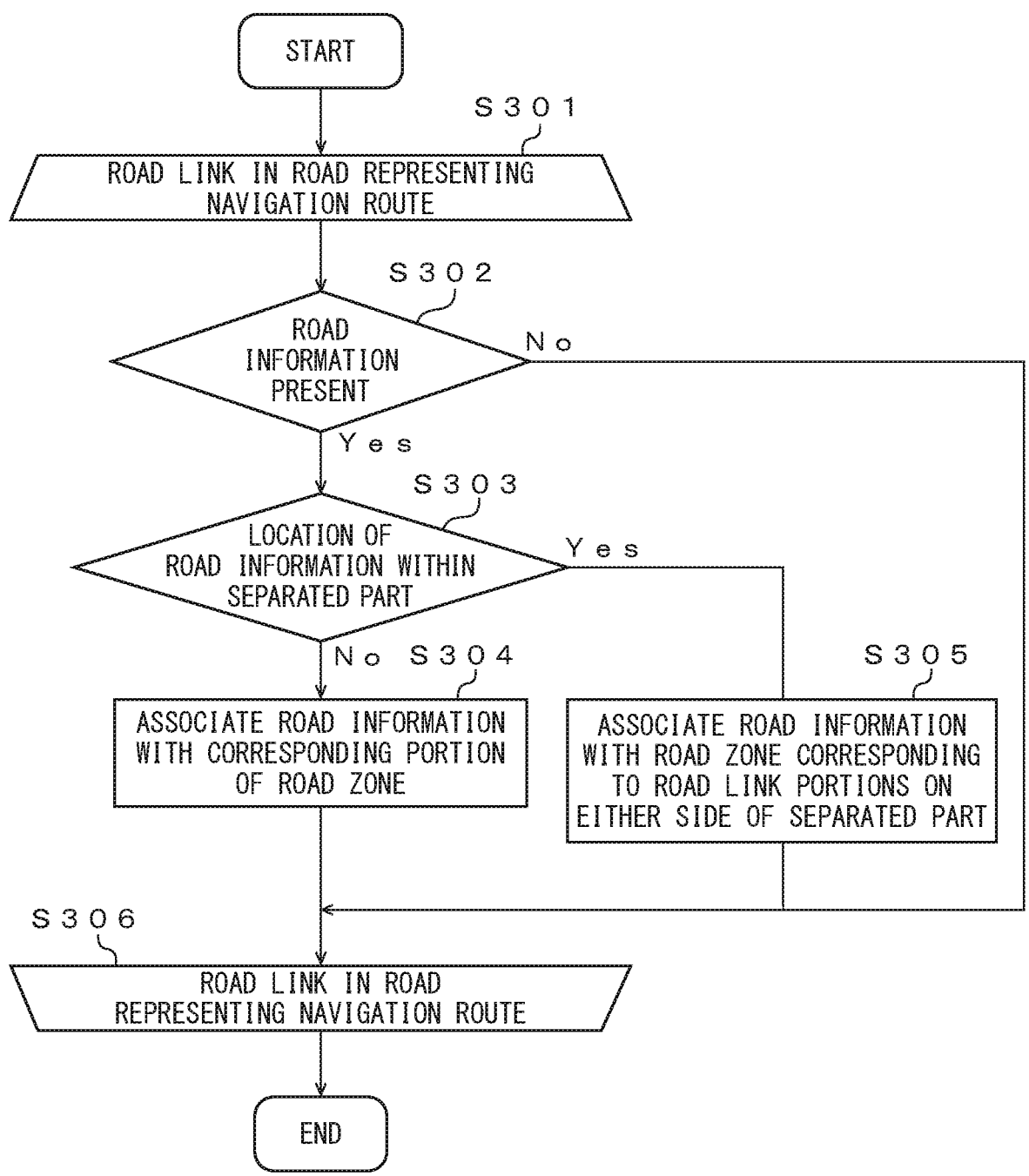
FIG. 9 is an operation flow chart for association processing by a vehicle control system of the embodiment.

Association processing of the map information assessment device 12 of the vehicle control system 1 will now be explained with reference to FIG. 9. After having carried out the processing shown in FIG. 8, or at an associated time with a predetermined cycle, the map information assessment device 12 carries out the association processing shown in FIG. 9. In the association processing, road information associated with road links (traffic information or information regarding whether or not the automatic control system can be used) is associated with road zones in the location-estimating map.

The associating unit 234 of the map information assessment device 12 carries out processing between step S301 and step S306 for each of the link zones in the roads representing the navigation route R. For example, the associating unit 234 refers to the road link management table 70, selecting road links according to the order of road link IDs, whose information indicating that the road links are in roads forming the navigation route R is registered in the navigation route-forming information column 75, and carries out processing between step S301 and step S306.

First, for the selected road link, the associating unit 234 refers to the link information column 74 of the road link management table 70 and determines whether or not the selected road link has road information (step S302).

If the road link has road information (step S302—Yes), the associating unit 234 refers to the road link management table 70 and link zone management table 90, and determines whether or not the location or zone within the road link with which the road information is associated, is within a separated part between the adjacent link zones (step S303). Specifically, the associating unit 234 refers to the link information column 74 of the road link management table 70, and acquires the location or zone within the road link with which the road information is associated (this will hereunder be referred to as "road information location"). The associating unit 234 also refers to the starting point location column 92 and end point location column 93 of the link zone management table 90, and determines whether there is any link zone ID which contains the road information location. If there is a link zone ID containing the road information location, then the associating unit 234 determines that the road information location is not in a separated part (step S303—No). This means that the road information location is in a link zone. If there is no link zone ID containing the road information location, on the other hand, then the associating unit 234 determines that the road information location is in a separated part (step S303—Yes). This means that the road information location is not in any link zone.

When the road information location is not in a separated part, the associating unit 234 associates road information for a road link in the section of the road zone corresponding to the road information location (step S304). The associating unit 234 refers to the link zone management table 90 and acquires a road zone ID matching the link zone ID that was searched for in step S303. The associating unit 234 refers to the road zone management table 80 and registers road information and road location information for the selected road link, in the road zone information column 84 with which the acquired road zone ID is associated.

In the example shown in FIG. 6, the associating unit 234 associates the road information and road location information for the selected road link T1, with the road zone S2.

When the vehicle 10 is being driven by automatic control, after the drive planning device 16 of the vehicle control system 1 has determined that the current location of the vehicle 10 can be estimated using the location-estimating map for a road zone that is scheduled to be entered from the current moment, it refers to the road zone management table 80 to determine the presence or absence of road information for the road zone. When the road zone includes road information, the drive planning device 16 refers to the road zone information column 84 of the road zone management table 80 and acquires the road information registered in the road zone information column 84. The drive planning device 16 may switch control of the vehicle 10 depending on the type of road information. For example, when the road information includes information for road obstacle, weather, traffic lane restriction or chain restriction, the drive planning device 16 notifies the driver of a hands-on request using the display device 5a of the UI 5. When the road information includes information for road closure, one-way restriction or lamp restriction, the drive planning device 16 also notifies the driver of a request to switch driving of the vehicle 10 from automatic control to manual control using the display device 5a of the UI 5.

When the road information location includes a separated part, on the other hand, the associating unit 234 refers to the link zone management table 90 and acquires link zone IDs for the two link zones located on either side of the separated part. The road information of the selected road link is associated with a section of the road link in the navigation map between the end point of the link zone and the starting point of the other link zone adjacent to the link zone, which is adjacent to the separated part. The associating unit 234 also refers to the link zone management table 90 and acquires road zone IDs matched with the link zone IDs for the two link zones located on either side of the separated part. The associating unit 234 also associates road information for the selected road link with the road zones of the location-estimating map corresponding to each of the link zones located on either side of the separated part of the road link in the navigation map (step S305). Specifically, the associating unit 234 refers to the road zone management table 80 and registers road information for the selected road link, in the road zone information column 84 with which the two acquired road zone IDs are associated.

In the example shown in FIG. 6, the associating unit 234 associates road information for the selected road link T3 with road zones S5, S6 in the location-estimating map which respectively correspond to the two link zones C5, C6 located on either side of the separated part which has the zone adjacent distance D5. This allows road information for the road links to be associated with the road zones even if there is a difference between the positional information of the roads in the location-estimating map and the positional information of the roads in the navigation map.

Figure 10:
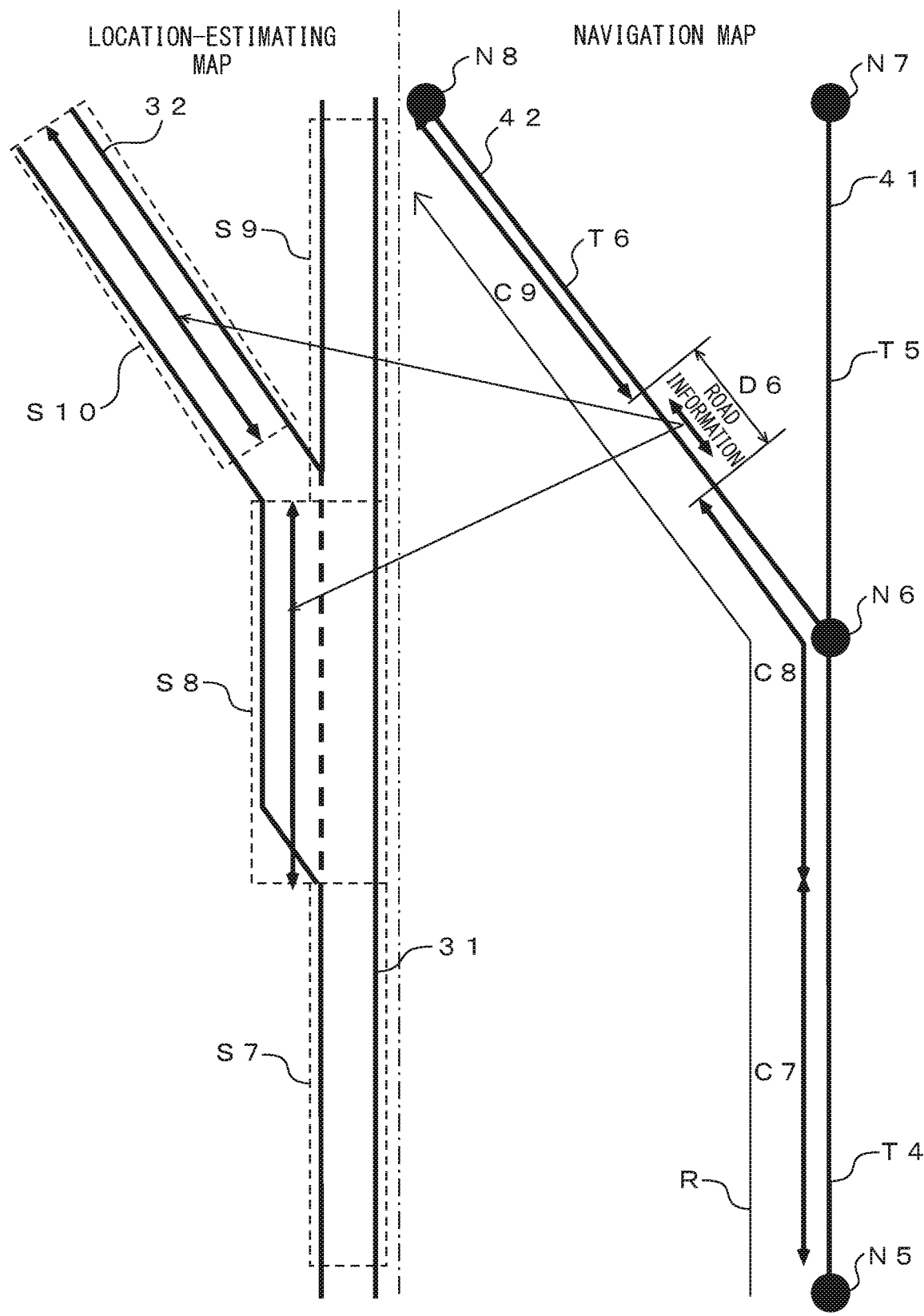
FIG. 10 is a diagram illustrating association processing by a vehicle control system (1).

FIG. 10 shows an example of association processing for a case where road information location is within a separated part. In the navigation map, the navigation route R branches from a road link T4 representing a road 41, to a road link T6 representing a road 42, at a node N6. In the location-estimating map, the corresponding terrain is shown as branching from the road 31 to the road 32.

The selected road link T6 has road information for a separated part having a zone adjacent distance D6. The associating unit 234 associates road information for the selected road link T6 with road zones S8, S10 in the location-estimating map respectively corresponding to the two link zones C8, C9 located on either side of the separated part which has the zone adjacent distance D6.

When the road link does not have road information (step S302—No), processing proceeds to just before step S306, and processing between step S301 and step S306 is carried out for the next road link.

The associating unit 234 carries out processing between step S301 and step S306 for each of the other link zones in the roads representing the navigation route R, thereby associating the road information for the road links with the road zones of the location-estimating map.

As explained above, the map information assessment device matches each of a plurality of first zones representing divisions of the first road in a first map (for example, a location-estimating map) used for estimating the location of the vehicle, with second zones representing divisions of a second road in a second map (for example, a navigation map) used for traveling of the vehicle, where each second zone corresponding to one first zone is a zone having the same length as the one first zone in the direction from a starting point toward an end point of the one first zone, the starting point being defined as a location on the second road closest to the starting point of the one first zone. The map information assessment device also calculates a zone adjacent distance between the end point of one second zone and the starting point of another second zone adjacent to the one second zone. When the zone adjacent distance is greater than a predetermined threshold, the map information assessment device determines that the positional information for the first road in the first zone is different from the positional information for the second road in the second zone corresponding to the first zone. Since the map information assessment device of this disclosure can thereby detect differences between positional information of roads in a first map and positional information of roads in a second map, it allows the vehicle to be safely controlled by automatic control using the first map and second map. In particular, since the map information assessment device can detect whether or not differences between the first map and second map are differences that will not affect automatic control of the vehicle, it is possible to increase the number of situations in which automatic control of the vehicle is possible using the first map and second map.

The map information assessment device, computer program for map information assessment and map information assessment method of the embodiment described above relating to the present disclosure may incorporate appropriate modifications that are still within the gist of the invention. Moreover, the technical scope of the disclosure is not limited to these embodiments, and includes the invention and its equivalents as laid out in the Claims.

Figure 11:
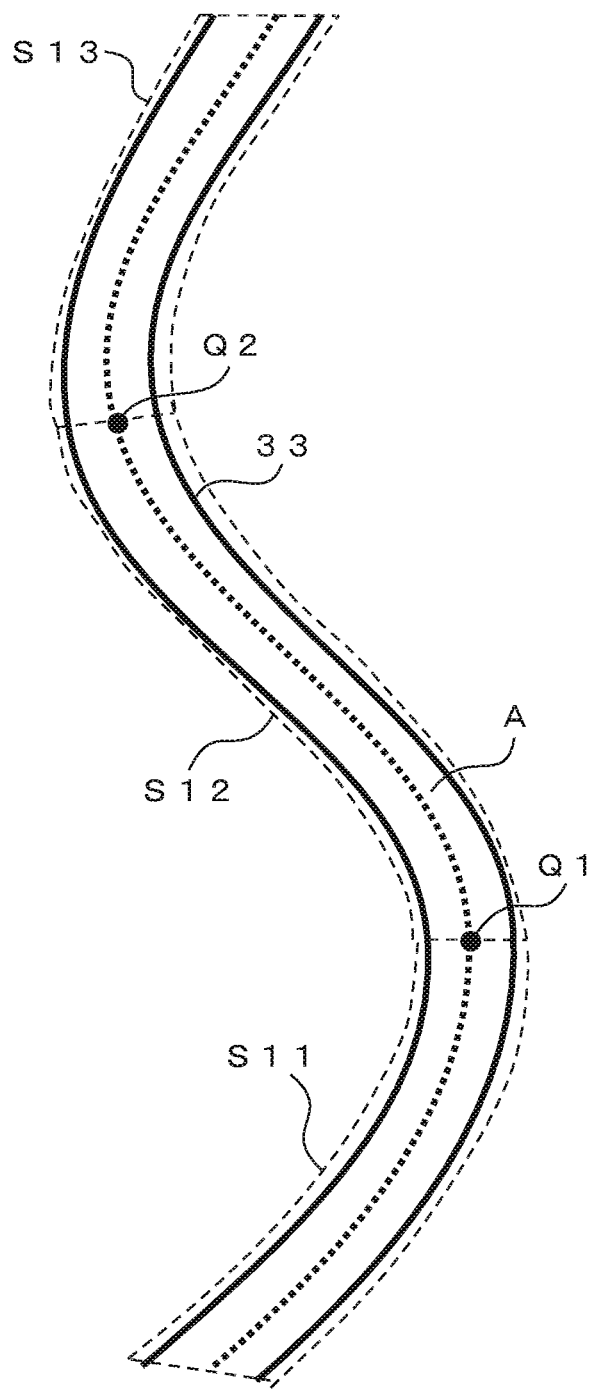
FIG. 11 is a diagram illustrating how a road is divided into road zones.

For example, the roads in the location-estimating map of the embodiment described above are divided into road zones of predetermined length, but the method of dividing the roads in the location-estimating map into multiple road zones is not limited to this method. For example, the matching unit 231 of the map information assessment device 12 may set the road zones for the roads in the location-estimating map based on inflection points of the roads, as shown in FIG. 11. In FIG. 11, in a portion of a road 33 in a location-estimating map, a center line A in the widthwise direction of the road 33 has two inflection points Q1, Q2. Based on the inflection points Q1, Q2, the matching unit 231 divides this portion of the road 34 into three road zones S11, S12, S13, comprising a zone before the inflection point Q1, the section between the two adjacent inflection points Q1, Q2, and a zone after the inflection point Q2.

Also, in the embodiment described above, road information associated with a separated part was associated with road zones corresponding to the respective link zones located on either side of the separated part in the navigation road, but the method of association is not limited to this method. For example, the associating unit 234 may associate road information associated with a separated part of a road in the navigation map, with a section of a road zone corresponding to a road link that includes the separated part of the road.

Figure 12:
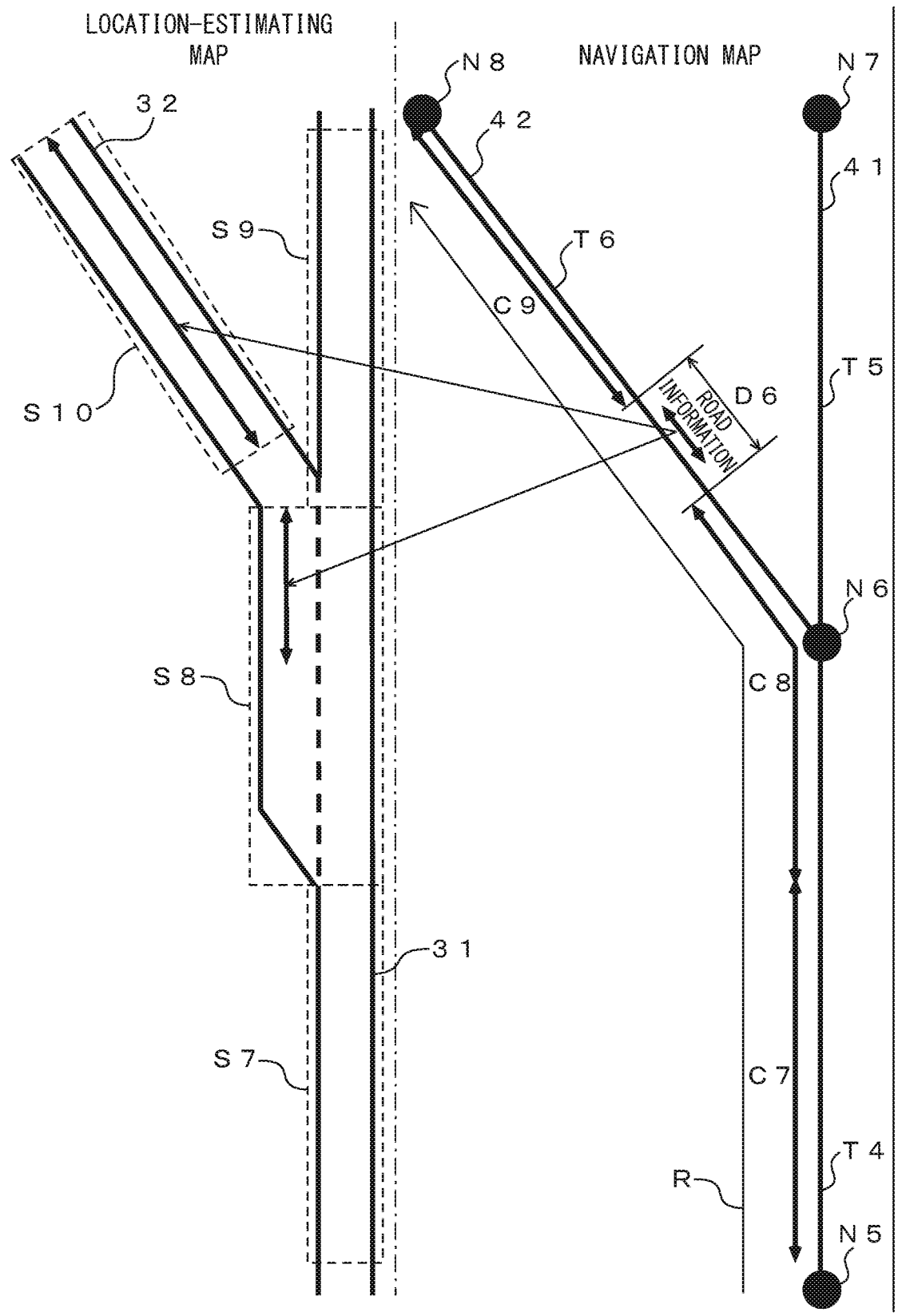
FIG. 12 is a diagram illustrating association processing by a vehicle control system (2).

The example shown in FIG. 12 is another example of association processing for a case where road information location is within a separated part. The terrain of FIG. 12 corresponds to FIG. 11. The selected road link T6 of the road 42 has road information for a separated part having a zone adjacent distance D6. The associating unit 234 associates road information associated with a separated part of a road 42 in the navigation map, with sections of a road zone S8 and a road zone S10 corresponding to a road link T6 that includes the separated part of the road 42. Specifically, the road information for the separated part of the road link T6 is associated with a section of the road zone S8 corresponding to the zone between the node N6 and the separated part of the road link T6. The road information for the separated part of the road link T6 is also associated with a section of the road zone S10 corresponding to the zone between the separated part and the node N8 of the road link T6. In the example shown in FIG. 12, the zone between the separated part and the node N8 of the road link T6 corresponds to the entirety of the road zone S10.

When one road in the navigation map has at least a predetermined number of separated parts with zone adjacent distances that are larger than the predetermined distance threshold, the zone assessment unit 233 of the map information assessment device 12 may determine that the entire positional information for that road in the location-estimating map is different from the entire positional information for the road in the navigation map.

Figure 13:
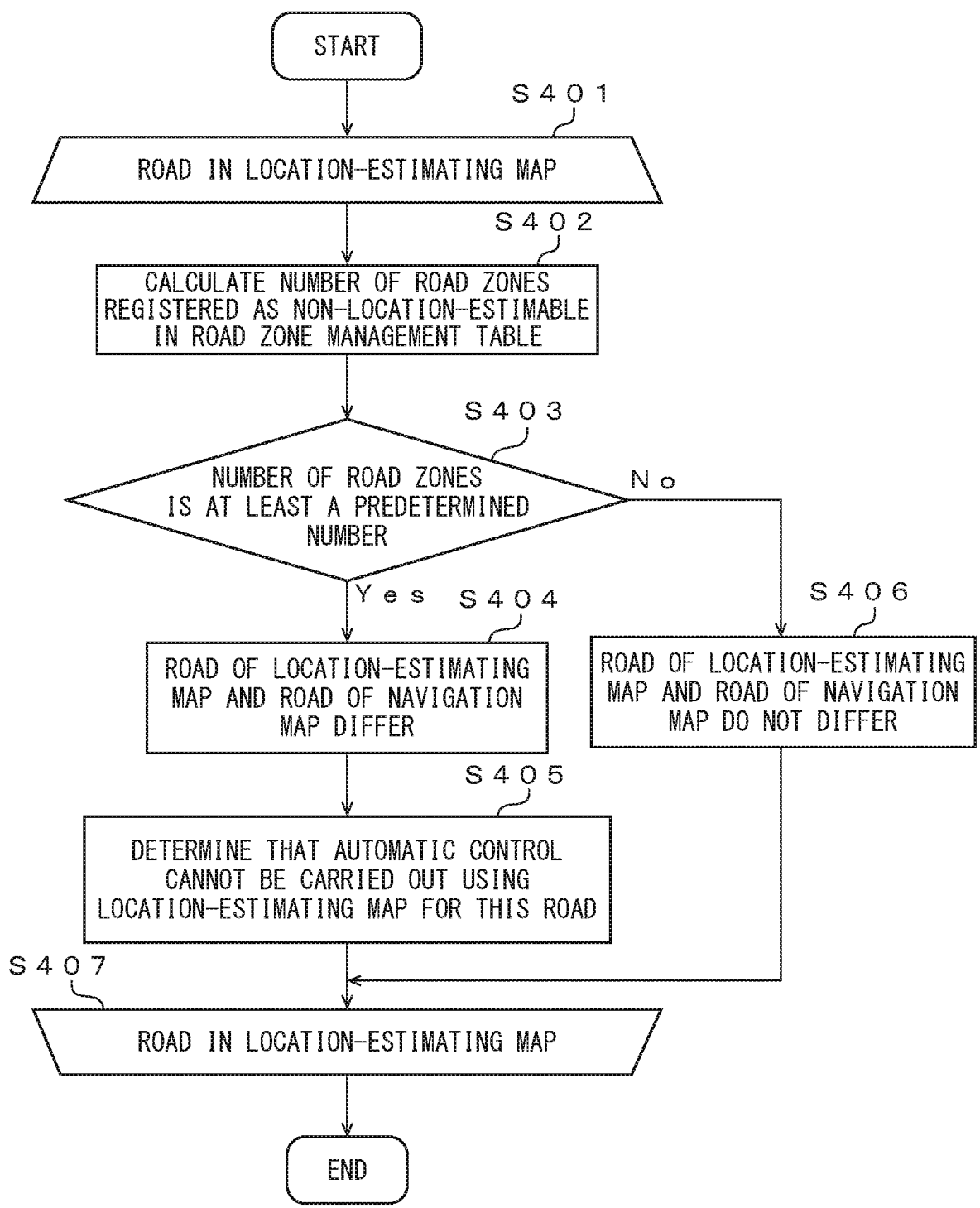
FIG. 13 is an operation flow chart for map information assessment processing by a vehicle control system of the embodiment (3).

FIG. 13 is an operation flow chart for the zone assessment unit 233 of the map information assessment device 12. The zone assessment unit 233 may also carry out the processing shown in FIG. 13 after having carried out the processing shown in FIG. 9.

The zone assessment unit 233 carries out processing between step S401 and step S407 for each of the roads in the location-estimating map. For example, the zone assessment unit 233 refers to the road zone information column 84 of the road zone management table 80, selects one road in the location-estimating map in order, and carries out the processing between step S401 and step S407 for the selected road.

First, the zone assessment unit 233 refers to the road zone management table 80 and, for the selected road, acquires the number of road zones in the selected road for which it is registered in the location estimability information column 85 that the location cannot be estimated (step S402).

The zone assessment unit 233 then determines whether or not the number of road zones for which it is registered that the location cannot be estimated, for the selected road in the location-estimating map, is at least a predetermined number (step S403).

If the number of road zones for which it is registered that the location cannot be estimated is at least the predetermined number (step S403—Yes), then the zone assessment unit 233 determines that the entire positional information for the road in the location-estimating map differs from the entire positional information for the road in the navigation map, for the selected road (step S404).

The zone assessment unit 233 then determines that automatic control is not possible using the location-estimating map, for the selected road of the location-estimating map (step S405). When the drive planning device 16 of the vehicle control system 1 is automatically controlling driving of the vehicle 10, and a road scheduled to be entered has been assessed to not allow automatic control using the location-estimating map, the driver is notified before entering the road that driving of the vehicle 10 is to be switched from automatic control to manual control.

When the number of road zones for which it is registered that the location cannot be estimated is smaller than the predetermined number (step S403—No), however, the zone assessment unit 233 determines that the positional information for the road in the location-estimating map does not differ from the positional information for the road in the navigation map, for the selected road in the location-estimating map (step S403).

By carrying out processing between step S401 and step S407 for each road in the location-estimating map, the zone assessment unit 233 can determine whether or not automatic control can be carried out using the location-estimating map for each of the roads in the location-estimating map. This allows the map information assessment device 12 to determine that, for a road that includes at least predetermined number of road zones in which automatic control cannot be carried out using the location-estimating map, automatic control cannot be carried out using the location-estimating map for the road as a whole. Moreover, when traveling on such a road, the map information assessment device 12 can alleviate burden on the driver by notifying the driver that driving of the vehicle 10 is to be switched from automatic control to manual control, instead of notifying the driver of each road zone.

The invention claimed is:

1. A map information assessment device comprising:
a processor configured to:
retrieve, from a storage memory, a first map used for estimating a location of a vehicle and a second map used for traveling of the vehicle, wherein the first map displays a first road divided into a plurality of first zones, wherein the second map displays a second road divided into a plurality of second zones, wherein the second map is different from the first map,
match each first zone from the plurality of first zones with a corresponding second zone from the plurality of second zones, the matching being performed by using a location on the second road that is closest to a starting point of one first zone as the starting point, and using as the corresponding second zone, a zone in the second map having a same length as the one first zone in a direction from the starting point toward an end point of the one first zone,
calculate, after the matching is performed, a zone adjacent distance between an end point of one second zone and a starting point of another second zone adjacent to the one second zone, and
based on a determination that the zone adjacent distance is greater than a predetermined threshold, determine that positional information for the first road in the first zone is different from positional information for the second road in the second zone corresponding to the first zone,
wherein a vehicle control device in communication with the map information assessment device controls a movement of the vehicle based on the positional information for the first road and the positional information for the second road.

2. The map information assessment device according to claim 1, wherein the processor is further configured to calculate the zone adjacent distance between the end point of the one second zone and the starting point of the another second zone adjacent to the one second zone, which is included in the second road representing a navigation route generated based on a current location of the vehicle, a destination location, and the second map.

3. The map information assessment device according to claim 1, wherein the processor is further configured to determine that an entirety of the positional information for the second road differs from an entirety of the positional information for the first road in the first map based on a determination the second road has at least a predetermined number of separated parts with zone adjacent distances greater than the predetermined threshold.

4. The map information assessment device according to claim 1, wherein the processor is further configured to set at least one first zone from the plurality of first zones based on an inflection point of the first road.

5. The map information assessment device according to claim 1, wherein
the second road is associated with road information representing road-related information, and
the processor is further configured to associate road information associated with a second road separated part between the end point of the one second zone and the starting point of the another second zone adjacent to the one second zone, with first zones respectively corresponding to the second zones located on either side of the second road separated part.

6. A non-transitory computer readable medium having instructions stored therein, which when executed by a processor in a map information assessment device cause the processor to execute a method comprising:
retrieving, from a storage memory, a first map used for estimating a location of a vehicle and a second map used for traveling of the vehicle, wherein the first map displays a first road divided into a plurality of first zones, wherein the second map displays a second road divided into a plurality of second zones, wherein the second map is different from the first map,
matching each first zone from the plurality of first zones with a corresponding second zone from the plurality of second zones, the matching being made by using a location on the second road that is closest to a starting point of one first zone as the starting point, and using as the corresponding second zone, a zone in the second map having a same length as the one first zone in a direction from the starting point toward an end point of the one first zone;
calculating, after the matching is performed, a zone adjacent distance between an end point of one second zone and a starting point of another second zone adjacent to the one second zone; and
based on a determination that the zone adjacent distance is greater than a predetermined threshold, determining that positional information for the first road in the first zone is different from positional information for the second road in the second zone corresponding to the first zone,
wherein a vehicle control device in communication with the map information assessment device controls a movement of the vehicle based on the positional information for the first road and the positional information for the second road.

7. A map information assessment method performed by a map information assessment device, the method comprising:
retrieving, from a storage memory, a first map used for estimating a location of a vehicle and a second map used for traveling of the vehicle, wherein the first map displays a first road divided into a plurality of first zones, wherein the second map displays a second road divided into a plurality of second zones, wherein the second map is different from the first map,
matching each first zone from the plurality of first zones with a corresponding second zone from the plurality of second zones, the matching being made by using a location on the second road that is closest to a starting point of one first zone as the starting point, and using as the corresponding second zone, a zone in the second map having a same length as the one first zone in a direction from the starting point toward an end point of the one first zone;
calculating, after the matching is performed, a zone adjacent distance between an end point of one second zone and a starting point of another second zone adjacent to the one second zone; and
based on a determination that the zone adjacent distance is greater than a predetermined threshold, determining that positional information for the first road in the first zone is different from positional information for the second road in the second zone corresponding to the first zone,
wherein a vehicle control device in communication with the map information assessment device controls a movement of the vehicle based on the positional information for the first road and the positional information for the second road.

* * * * *